No. 841,708. PATENTED JAN. 22, 1907.
J. McCLURE.
WEEDING HOE.
APPLICATION FILED DEC. 13, 1906.

Witnesses
Arthur Wesley
M. A. Schmidt

John McClure,
Inventor,

By Milo B. Stevens & Co.
Attorneys

UNITED STATES PATENT OFFICE.

JOHN McCLURE, OF WEATHERBY, MISSOURI.

WEEDING-HOE.

No. 841,708.   Specification of Letters Patent.   Patented Jan. 22, 1907.

Application filed December 13, 1906. Serial No. 347,625.

*To all whom it may concern:*

Be it known that I, JOHN MCCLURE, a citizen of the United States, residing at Weatherby, in the county of Dekalb and State of Missouri, have invented certain new and useful Improvements in Weeding-Hoes, of which the following is a specification.

This invention is a weeding-hoe, and has for its object an implement of this kind provided with a double-edged blade which is mounted in such a way that either cutting edge is automatically brought into proper working position when the implement is in use.

Figure 1:
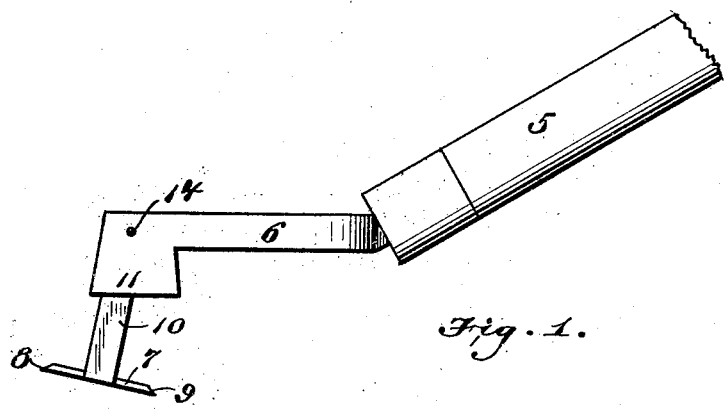
Figure 2:
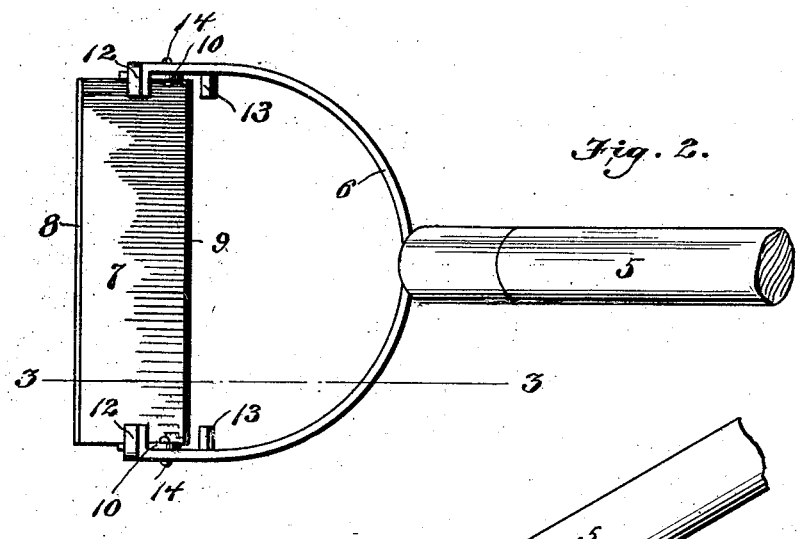
Figure 3:
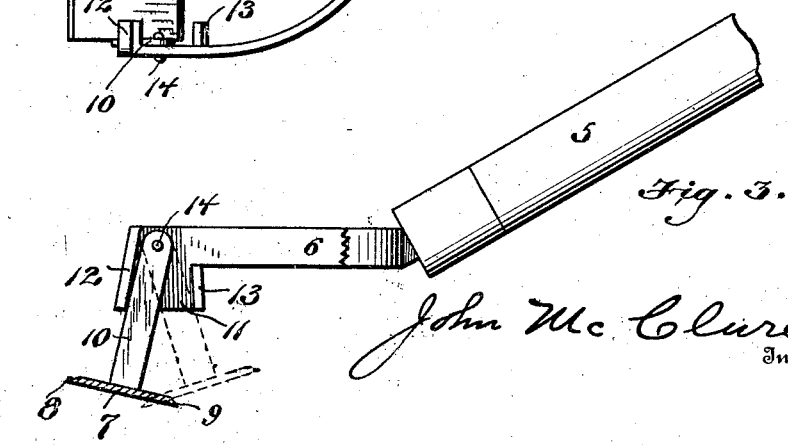

In the accompanying drawings, Figure 1 is an elevation of the invention. Fig. 2 is a plan view. Fig. 3 is a section on the line 3 3 of Fig. 2.

Referring specifically to the drawings, 5 denotes the hoe-handle, in the lower end of which is inserted and secured in any suitable manner the shank of a fork 6, to which the hoe-blade 7 is connected. The blade is double-edged, so that the implement may be used by pushing it forwardly or pulling it back. The cutting edges of the blade are indicated at 8 and 9, respectively.

At the ends of the hoe-blade are upstanding arms 10, whereby the blade is pivotally secured to the fork 6. At the outer end of the fork-arms are downward extensions 11, and at the front and rear ends of such extensions are inturned flanges 12 and 13, respectively. The arms 10 are pivoted to the fork at 14 in such a manner that they can swing freely in either direction between the flanges 12 and 13, which serve as stops to limit such swing.

The manner in which the hoe-blade is mounted causes it to automatically swing into working position, it being desirable that the cutting edges be presented to the ground at a slight angle when using the implement. Upon pushing the implement forwardly the blade swings rearwardly until the arms 10 are stopped by the flanges 13. When the implement is pulled back, the blade swings forward until the arms 10 are stopped by flanges 12. The position of the flanges 12 and 13 with respect to the pivot 14 is such that in either position the cutting edges will be presented to the ground at the desired angle.

I claim—

1. In a hoe, a pivotally-mounted blade, and stops between which the blade swings.

2. In a hoe, a vertically-swinging blade, and stops to limit the swing of the blade in either direction.

3. In a hoe, a blade-support, a blade having at its ends upstanding arms pivotally connected to the support, and stops for the arms to limit the swing of the blade.

4. In a hoe, a forked blade-support having stop projections, and a blade having at its ends upstanding arms pivotally connected to the fork between the stops.

In testimony whereof I affix my signature in presence of two witnesses.

JOHN McCLURE.

Witnesses:
 JAMES R. JONES,
 C. N. KALOSAN.